No. 849,134. PATENTED APR. 2, 1907.
J. HUSSER.
GRATER.
APPLICATION FILED DEC. 27, 1906.
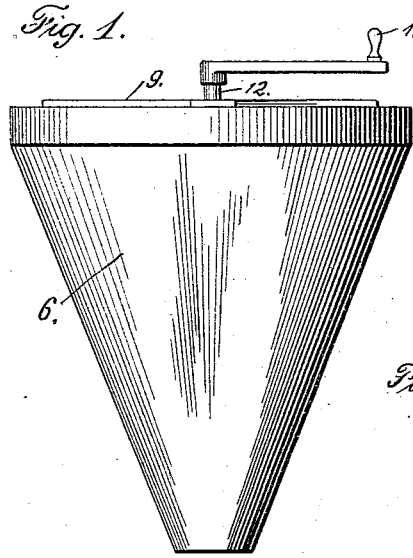
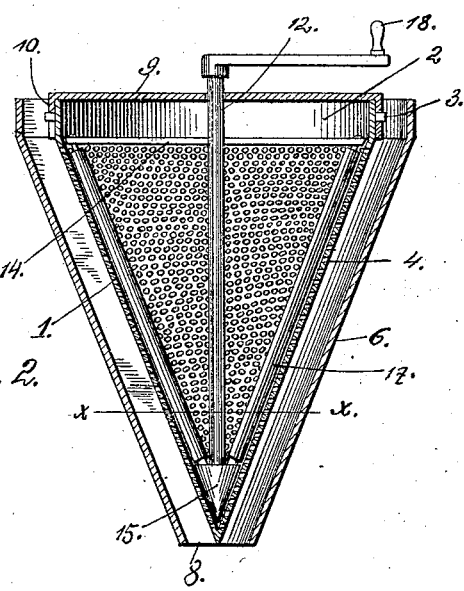
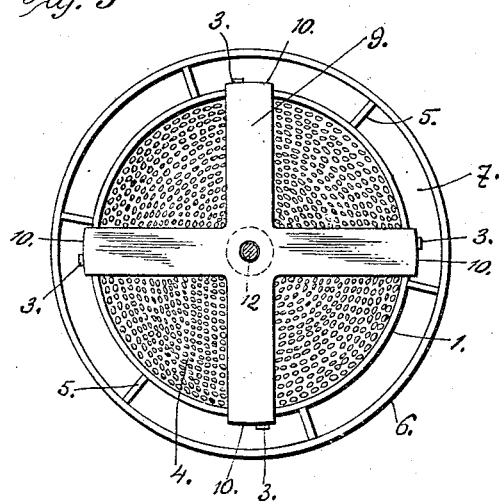
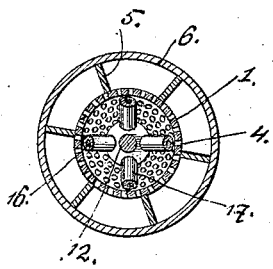
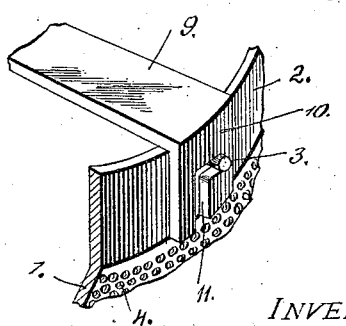
WITNESSES: INVENTOR
BY
Attorneys

UNITED STATES PATENT OFFICE.

JULES HUSSER, OF PITTSBURG, PENNSYLVANIA.

GRATER.

No. 849,134.     Specification of Letters Patent.     Patented April 2, 1907.

Application filed December 27, 1906. Serial No. 349,711.

*To all whom it may concern:*

Be it known that I, JULES HUSSER, a citizen of the United States of America, residing at Pittsburg, in the county of Allegheny and State of Pennsylvania, have invented certain new and useful Improvements in Graters, of which the following is a specification, reference being had therein to the accompanying drawings.

This invention relates to utensils; and the invention has for its object to provide a grater, sieve, and vegetable disintegrator.

Another object of this invention is the provision of novel means for protecting the perforations or meshwork of the utensil, whereby they cannot be injured by the rough handling of the utensil.

A further object of this invention is to provide the utensil with novel means for agitating and mashing vegetables in the utensil.

With these and other objects in view, which will more readily appear as the invention is better understood, the same consists in the novel construction, combination, and arrangement of parts to be hereinafter more fully described and then specifically pointed out in the appended claims.

In the drawings, Figure 1 is a side elevation of the utensil. Fig. 2 is a vertical sectional view of the same. Fig. 3 is a plan. Fig. 4 is a horizontal sectional view taken on the line $x$ $x$ of Fig. 2. Fig. 5 is a fragmentary perspective view of a portion of the utensil, illustrating the manner of attaching the agitating or mashing device to the utensil.

To put my invention into practice, I provide an inverted-cone-shaped receptacle 1, having a vertical rim 2, which carries diametrically-opposed pins or lugs 3. The inclined sides of the receptacle 1 are provided with a plurality of perforations 4, said perforations being formed close to one another to provide a small mesh, through which vegetables, fruits, or similar articles can be forced.

The sides of the receptacle 1 are provided with radially-disposed ribs 5, which support a casing 6, conforming in contour to the receptacle 1. A plurality of compartments 7 are formed around the receptacle 1 by the casing 6 and ribs 5, these compartments receiving and conveying the mashed or disintegrated vegetables to a suitable receptacle in a place beneath the open end 8 of the casing. The casing and the ribs 5 serve to protect the perforated receptacle 1 and prevent the same from being injured when roughly handled.

In connection with the perforated receptacle 1 I employ an agitating or mashing device which is detachably connected to said receptacle. The device comprises a spider-frame 9, having depending ends 10, provided with bayonet-shaped slots 11, these slots receiving the pins 3, carried by the rim 2 of the receptacle 1. In the frame 9 is journaled a vertically-disposed shaft 12, carrying a spider-frame 14, which lies at the top of the perforated portion of the receptacle 1, and a detachable cone-shaped head 15 upon its lower end. The head 15 and the ends of the spider-frame 14 are connected together by rods 16, having journaled thereon rollers 17, adapted to bear against the inner sides of the receptacle 1. The head 15 is detachably connected to the lower end of the shaft 12, whereby the same may be removed and another head placed thereon when desired. The upper end of the shaft 12 is provided with a crank 18 for operating the mashing or agitating device.

My improved utensil is used for seeding berries, disintegrating chocolate, and crushing and agitating various vegetables. After the vegetables have been placed within the utensil the handle is rotated to impart a rotary movement to the shaft 12 and the parts carried thereby. The rollers 17, bearing upon the inner sides of the perforated receptacle 1, are adapted to thoroughly mash and disintegrate the contents of the receptacle, forcing the contents through the perforations 4 thereof into the compartments 7, from where they descend to the opening 8 of the casing.

The agitating or mashing device is detachably connected to the utensil, whereby the utensil can be used without the device and can be easily and quickly cleansed.

The utensil is made of a non-corrosive metal and may be of any desired size.

What I claim, and desire to secure by Letters Patent, is—

1. A utensil of the class described embodying a perforated inverted-cone-shaped receptacle having a vertical upper rim, ribs carried by said receptacle, a casing carried by said ribs and forming a plurality of compartments around said receptacle, a spider-frame detachably connected to the rim of said receptacle, a vertically-disposed shaft journaled in said frame, a head carried by the lower end of said shaft, revoluble rollers supported by said shaft and engaging the inner sides of said receptacle, substantially as described.

2. In a crusher, an inverted-cone-shaped receptacle, a spider-frame detachably secured to the open upper end of said receptacle, a shaft journaled in said spider-frame, a head on the lower end of said shaft, a spider carried by said shaft, and rollers carried by said spider and head.

3. In a crusher, an inverted-cone-shaped perforated receptacle, a spider-frame secured to the open upper end of said receptacle, a shaft journaled in said spider-frame and having a head on its lower end seating in the apex of said cone-shaped receptacle, a spider carried by said shaft, and rollers carried by the spider and said head on the shaft, and operating against the inner face of said perforated cone-shaped receptacle.

In testimony whereof I affix my signature in the presence of two witnesses.

JULES HUSSER.

Witnesses:
MAX H. SCOLOVITZ,
F. M. SCHARFEN.